US008805766B2

(12) United States Patent
Ray

(10) Patent No.: US 8,805,766 B2
(45) Date of Patent: Aug. 12, 2014

(54) METHODS AND SYSTEMS FOR MODIFYING A KNOWLEDGE BASE SYSTEM

(75) Inventor: Tanushree Ray, Bangalore Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 805 days.

(21) Appl. No.: 12/907,181

(22) Filed: Oct. 19, 2010

(65) Prior Publication Data

US 2012/0095951 A1  Apr. 19, 2012

(51) Int. Cl.
  *G06F 17/00* (2006.01)
(52) U.S. Cl.
  USPC .......................................................... 706/47
(58) Field of Classification Search
  CPC .............. G06F 17/30; G06F 17/30864; G06F 17/30424; G06F 17/3053; G06F 17/28; G06F 17/2765; G06F 17/2785
  See application file for complete search history.

(56) References Cited

U.S. PATENT DOCUMENTS

| 6,735,586 | B2* | 5/2004 | Timmons | 1/1 |
| 7,240,067 | B2 | 7/2007 | Timmons | |
| 7,558,778 | B2* | 7/2009 | Carus et al. | 1/1 |
| 7,797,298 | B2* | 9/2010 | Sareen et al. | 707/706 |
| 2005/0081189 | A1 | 4/2005 | Krasikov et al. | |
| 2008/0306941 | A1 | 12/2008 | Dill et al. | |
| 2009/0024574 | A1 | 1/2009 | Timmons | |
| 2010/0131482 | A1 | 5/2010 | Linthicum | |
| 2010/0145927 | A1 | 6/2010 | Kasbekar | |
| 2011/0252313 | A1* | 10/2011 | Tanushree et al. | 715/255 |

FOREIGN PATENT DOCUMENTS

| WO | 02073331 | 9/2002 |
| WO | 2010070651 | 6/2010 |

OTHER PUBLICATIONS

Kwon et al., "Query Expansion Using Domain-Adapted, Weighted Thesaurus in an Extended Boolean Model", 1994, CIKM, pp. 140-146.*

* cited by examiner

*Primary Examiner* — Jeffrey A Gaffin
*Assistant Examiner* — Paulinho E Smith
(74) *Attorney, Agent, or Firm* — Benjamin Searle

(57) ABSTRACT

In one embodiment, a query is received at a knowledge base system via a communications link and a new rule is generated in response to an indication that a rule library of the knowledge base system does not include a rule associated with the query. A synthetic document descriptor is received and a value associated with the synthetic document descriptor is stored at an action identifier of the new rule. The new rule is then stored at the rule library. The new rule has a condition identifier field and an action identifier field, and the condition identifier field of the new rule has a value associated with the query. The synthetic document descriptor includes a first reference to a portion of a first document and a second reference to a portion of a second document.

20 Claims, 10 Drawing Sheets

```xml
<?xml version="1.0" encoding="ISO-8859-1"?>
<xs:schema xmlns:xs="http://www.w3.org/2001/XMLSchema">
<xs:element name="synthetic_document_descriptor">
    <xs:complexType>
    <xs:attribute name="name" type="xs:string"/>
    <xs:sequence>
        <xs:element name="document_element_reference">
    </xs:sequence>
    </complexType>
</xs:element>

<xs:element name=" document_element_reference">
    <xs:complexType>
        <xs:element name="name" type=="xs:string"/>
        <xs:element name="path" type=="xs:string"/>
        <xs:element name="startLineNumber" type=="xs:positiveInteger"/>
        <xs:element name="endLineNumber" type=="xs:positiveInteger"/>
    </complexType>
</xs:element>
</xs:schema>
```

FIG. 4

METHODS AND SYSTEMS FOR MODIFYING A KNOWLEDGE BASE SYSTEM

BACKGROUND

A knowledge base system typically allows users to access information in various separate documents stored within that knowledge base system. For example, a user can provide a textual query string to a knowledge base system and receive a group of documents (or references or links) to documents related to the query. The user can access each of the documents to locate the information within that document that is relevant to the query.

Although such knowledge base systems can be effective at locating documents that are related to a query, users of such knowledge base systems typically must separately access each document identified by the knowledge base system to locate the relevant information with that document that is related to the query. In other words, the knowledge base system locates documents and the users access those documents to locate the desired information. Accessing and navigating the multiple documents can be time-consuming and tedious for the users.

Moreover, such knowledge base systems typically do not allow users to define custom result sets (e.g., specify the documents to which a query is related). In other words, users generally cannot provide input to the knowledge base systems to suggest or define more appropriate results for a query. As a result, users of such knowledge base systems are often unable to efficiently access information that meets their needs.

BRIEF DESCRIPTION OF THE DRAWINGS

FIG. 4 is an illustration of an XML schema representing a synthetic document descriptor, according to an embodiment.

DETAILED DESCRIPTION

Figure 1:
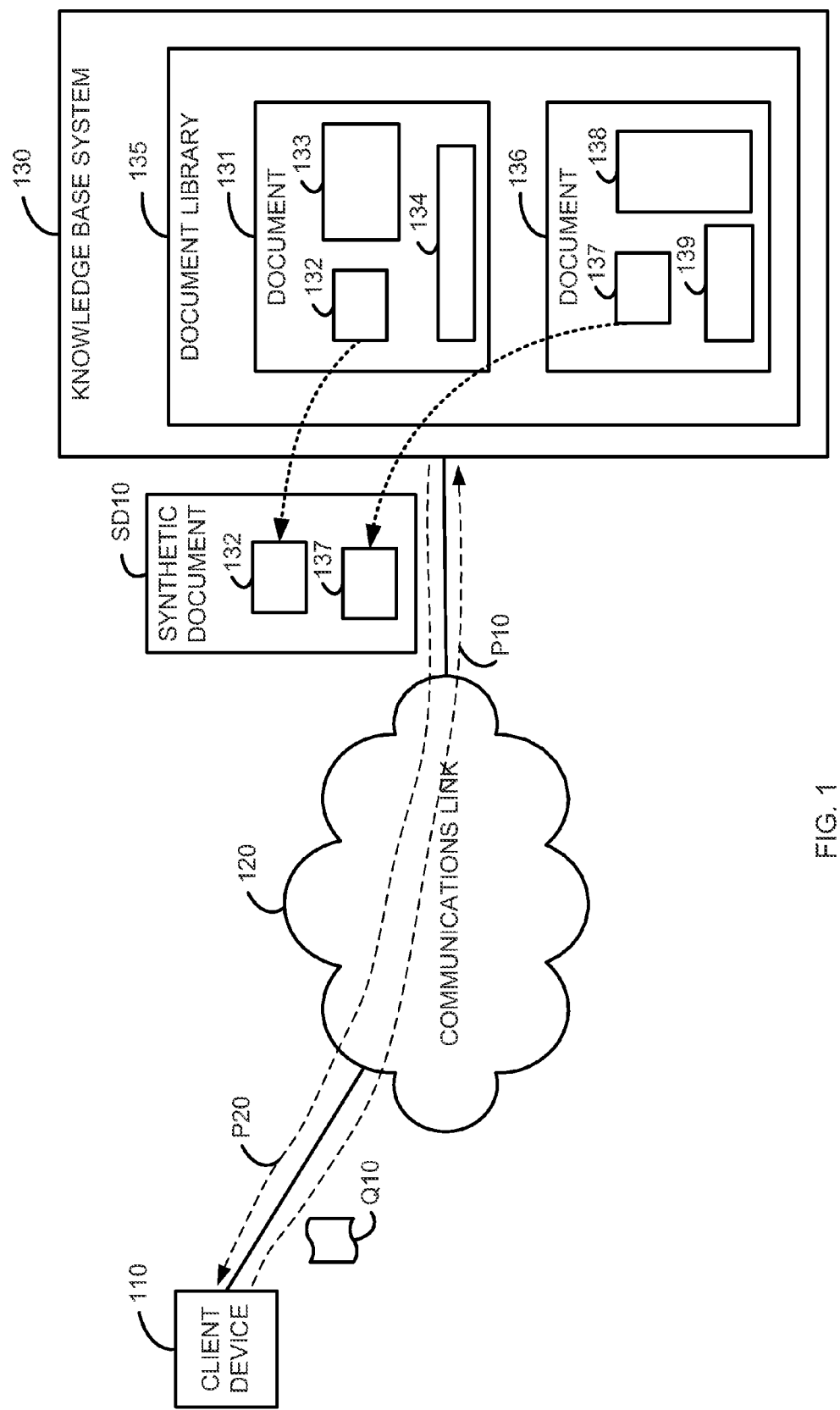
FIG. 1 is a schematic block diagram of a knowledge base system in communication with a client device, according to an embodiment.

Knowledge base systems can provide access to information (or knowledge) stored within the knowledge base. For example, a client or user of a knowledge base system can submit a query (or query string) to the knowledge base system and receive one or more documents (e.g., product manuals, database entries, electronic mail, weblogs, image files, video files, audio files, etc.) that include information related to the query. The knowledge base system identifies documents to provide to the client by searching the documents (or knowledge base) that are accessible to the knowledge base system. For example, the knowledge base can identify documents related to the query by performing a textual search of textual content of the documents and/or of metadata associated with the documents for terms related to the query. Additionally, the knowledge base can identify documents related to the query by performing image- and/or speech-recognition analyses of image, audio and/or video documents (or files) to identify visual and/or aural elements of the documents related to the query. In other words, the knowledge base system searches the documents, metadata associated with documents, and/or metadata or indices of the documents to identify semantic information within the documents that is related to the query. The documents that include such semantic information are then provided to the client.

As a more specific example, an Internet search engine accepts a query from a client (e.g., an Internet or web browser), searches an index of documents such as web pages (e.g., Hypertext Markup Language ("HTML") and/or Extensible Markup Language ("XML") files) to identify web pages related to the query, and sends a web page including a group of hyperlinks that reference the web pages related to the query to the client. A user of the client can select one or more hyperlinks via the client to access the web pages related to the query and navigate within those web pages to locate the information related to the query. Some Internet search engines provide the hyperlinks to the client in an order that reflects a ranking or ordering of the web pages referenced by those hyperlinks. For example, hyperlinks referencing the most frequently accessed web pages can be presented to the client before hyperlinks referencing less frequently accessed web pages. Moreover, hyperlinks referencing web pages that have multiple elements (e.g., portions or parts) related to the query can be presented to the client before hyperlinks referencing web pages that have only a single element related to the query.

As another example, a knowledge base system can exclusively include information related to a specific product (or class of products). More specifically, a knowledge base system can include information related to a particular model of notebook computer. This knowledge base system can include documents such as user guides, parts lists, tutorials, maintenance guides, and documentation of software included with the notebook computer. These documents can each include information related to the many components (e.g., software, display, keyboard, trackpad, optical drive, hard drive, etc.) of the notebook computer. Thus, if a client submits a query such as "display" to the knowledge base system, the knowledge base system returns documents (or reference such as hyperlinks to documents) that include information related to the display of the notebook computer. Typically, a user of the knowledge base system then accesses (e.g., opens) the documents and searches for the information related to the query. That is, the knowledge base system identifies the documents that include information that is relevant to the query, and then the user accesses the documents to locate all the relevant information.

As a specific example, the query for "display" can result in the knowledge base system providing a user guide for the notebook computer and a software manual for the operating system of the notebook computer. The user opens the user guide to locate a section (e.g., a chapter) about the display of the notebook computer and then opens the software manual to locate a section about the display.

Opening multiple documents to access all the information related to a query can be time consuming and burdensome for users, particularly when a knowledge base system returns dozens, hundreds, or even thousands of documents. Furthermore, some documents returned by a knowledge base system in response to a query are only marginally or tangentially related to a query and, therefore, unhelpful to a user. The user is generally unable, however, to exclude such documents from future result sets based on the same or a related query. Moreover, searching the documents accessible to a knowledge base system is typically a resource-intensive operation (e.g., a computing operation that requires large amounts of processing capacity and/or memory) because the documents accessible to the knowledge base are each searched in response to a query. These resource-intensive searches result in high costs for the computing devices (e.g., computer servers) that host a knowledge base system.

Embodiments discussed herein can combine elements (or portions or parts) of multiple documents into a synthetic document (i.e., a single document including the elements from the multiple documents) in response to a query based on a synthetic document descriptor. In other words, a user can receive a synthetic document including elements from multiple documents that are relevant to a query rather than references to the documents in response to the query. Additionally, embodiments discussed herein can provide an interface to receive synthetic document descriptors or update information related to synthetic document descriptors from users. Thus, a synthetic document generated in response to a particular query at one time can be different from another synthetic document generated at a later time in response to that same query due to input from users.

For example, FIG. 1 is a schematic block diagram of a knowledge base system in communication with a client device, according to an embodiment. Knowledge base system 130 is in communication with client device 110 via communications link 120. For example, client device 110 can send queries such as query Q10 to knowledge base system 130 and knowledge base system 130 can send synthetic documents such as synthetic document SD10 to client device 110 in response to such queries. FIG. 1 is a logical illustration of knowledge base system 130, communications link 120, and client device 110. Thus, knowledge base system 130, communications link 120, and client device 110 do not necessarily represent each physical computing device or network device within the environment illustrated in FIG. 1. Rather FIG. 1 illustrates the relationships between knowledge base system 130, communications link 120, and client device 110.

Client device 110 is a computing device such as a personal computer (e.g., a desktop computer or a notebook computer), a portable computing device (e.g., personal digital assistance ("PDA") or smartphone), a thin client device, or some other computing device. Client device 110 can include a software module stored at a memory and executed at a processor of client device 110 (i.e., the software module can be hosted at client device 110) that communicates with (e.g., sends queries to and receives responses from) knowledge base system 130 via a communications protocol. For example, client device 110 can host a web browser, knowledge base system 130 can include a web server interface, and client device 110 and knowledge base system 130 can communicate via the Hypertext Transport Protocol ("HTTP"). In other words, client device 110 can send query Q10 to knowledge base system 130 via HTTP and knowledge base system 130 can send synthetic document SD10 to client device 110 via HTTP.

Knowledge base system 130 accesses elements of documents stored at document library 135 and generates synthetic documents (i.e., documents composed, derived, or generated from the elements of other documents) based on elements of documents stored at document library 135 in response to queries received from client device 110. Knowledge base system 130 is implemented as a hardware module and/or a software module. For example, knowledge base system 130 can be implemented as application-specific circuitry or as a software module including instructions stored at a memory and executed at a processor in communication with the memory computing device such as a computer server. Said differently, knowledge base system 130 can be a software module (e.g., an application) hosted at a computing device or can be a computing device. Furthermore, knowledge base system 130 can be a virtual machine (or an application hosted at a virtual machine) hosted at a computing device.

Knowledge base system 130 includes document library 135. Document library 135 is a database, hard drive, or other data store or storage service that stores documents within knowledge base system 130. In other words, documents accessible to knowledge base system 130 such as documents 131 and 136 are stored at document library 135. Document library 135 can be local to knowledge base system 130. For example, document library 135 can be a hard drive of a computing device hosting an application implementing knowledge base system 135. Alternatively, documents library 135 can be remote from knowledge base system 130. For example, documents library 135 can be a data store accessible via a storage area network ("SAN") or via a local area network ("LAN") at a network attached storage ("NAS") device. Moreover, document library 135 can be distributed across one or more local data stores and one or more remote data stores. That is, some documents from document library 135 can be stored at a local data store and some documents from document library 135 can be stored at a remote data store.

Documents 131 and 136 stored at document library 135 include multiple elements (or document elements). Document elements can be any of a variety of parts, portions, sections, or segments of a document. For example, chapters, pages, figures, paragraphs, audio clips, video clips, and images can be document elements. In other words, document elements are the constituent portions of documents. As illustrated in FIG. 1, document 131 includes elements 132, 133, and 134. Document 136 includes elements 137, 138, and 139. For example, document 131 can be a user guide for a notebook computer and document 136 can be a video tutorial for that notebook computer. Elements 132 and 137 can be related to (e.g., include information relevant to) a display of the notebook computer. Element 133 can be related to memory module receptacle of the notebook computer. Elements 134 and 138 can be related to an operating system of the notebook computer. Element 139 can be related to a keyboard of the notebook computer. Thus, elements of different documents can be related to a common topic or subject.

Communications network 120 can include any connector and/or system that allow client device 110 to communicate with knowledge base system 130. For example, communications link 120 can be one or more of a cable (e.g., telecommunication cable, twisted-pair cable, coaxial cable, or fiber-optic cable), wireless link or connection (e.g., radio-frequency link, wireless optical link, or infrared link), or any other connector or system that supports transmission of communications symbols. Additionally, communications link 120 can include a communications network or combination of communications networks capable of transmitting information (e.g., symbols or signals representing data) such as, for example, an Ethernet network, a fiber-optic network, a wireless network, an intranet, and/or the Internet.

In some embodiments, communications link 120 can include multiple communications links and/or communications networks operatively coupled one to another by, for example, bridges, routers, switches, hubs, and/or gateways. For example, client device 110 can be operatively coupled to a cellular network (not shown) and knowledge base system 130 can be operatively coupled to a fiber-optic network (not shown). The cellular network and fiber-optic network can each be operatively coupled one to another via one or more network bridges, routers, switches, and/or gateways such that the cellular network and the fiber-optic network are operatively coupled to form a communications link. Alternatively, the cellular network and fiber-optic network can each be operatively coupled one to another via one or more additional communications networks. For example, the cellular network and the fiber-optic network can each be operatively coupled to the Internet such that the cellular network, the fiber-optic network and the Internet are operatively coupled to form a communications link.

As illustrated in FIG. 1, client device 110 sends query Q10 to knowledge base system 130 via communications link 120 along communication path P10. Communication path P10 and communication path P20 are logical and do not necessarily indicate each physical computing device or network device traversed by the data symbols or data signals transmitted along communication paths P10 and/or P20. Query Q10 can be, for example, a textual query string related to information stored at knowledge base system 130 within the documents (e.g., documents 131 and 136) accessible to knowledge base system 130. Thus, query Q10 can specify information that is requested from knowledge base system 130.

Knowledge base system 130 receives query Q10 and selects elements of documents 131 and 136 that are related to query Q10. As illustrated in FIG. 1, element 132 of document 131 is related to query Q10 and element 137 of document 136 is also related to query Q10. Knowledge base system 130 aggregates (or combines) elements 132 and 137 to generate synthetic document SD10. In some embodiments, knowledge base system 130 can reformat or alter elements 132 and/or 137 such that elements 132 and 137 within synthetic document SD10 are commonly formatted. For example, a font, color, and/or style of text within element 132 and/or element 137 can be altered to a common font, color, and/or style within synthetic document SD10 based on a template or format identifier. A template can be stored (not shown), for example, at knowledge base system 130. Moreover, a template can be received at knowledge base system 130 from, for example, client device 110.

After synthetic document SD10 is generated at knowledge base system 130, synthetic document SD10 is sent to client device 110 via communications link 120 along path P20. In other words, rather than providing client device with access to documents 131 and 136, each of which include information—at element 132 and element 137, respectively—related to query Q10, in response to query Q10, knowledge base system 130 generates and sends synthetic document SD10 including elements 132 and 137 (i.e., the elements of documents 131 and 136 with information relevant to query Q10) to client device 110. Synthetic document SD10 can be in any of a variety of formats including, for example, XML, HTML, Portable Document Format ("PDF"), a word processing format such as a Microsoft Word® format or an OpenDocument format, and/or a combination of formats. Thus, a user of knowledge base system 130 (i.e., a user at client device 110) can receive a synthetic document in response to a query rather than multiple documents.

As used in this specification, the singular forms "a," "an," and "the" include plural referents unless the context clearly dictates otherwise. Thus, for example, the term "document library" is intended to mean one or more document libraries or a combination of document libraries. Additionally, as used herein, the term "module" refers to circuitry and/or software, firmware, programming, machine- or processor readable instructions, commands, or code that are stored at a memory and executed or interpreted at a processor.

Figure 2:
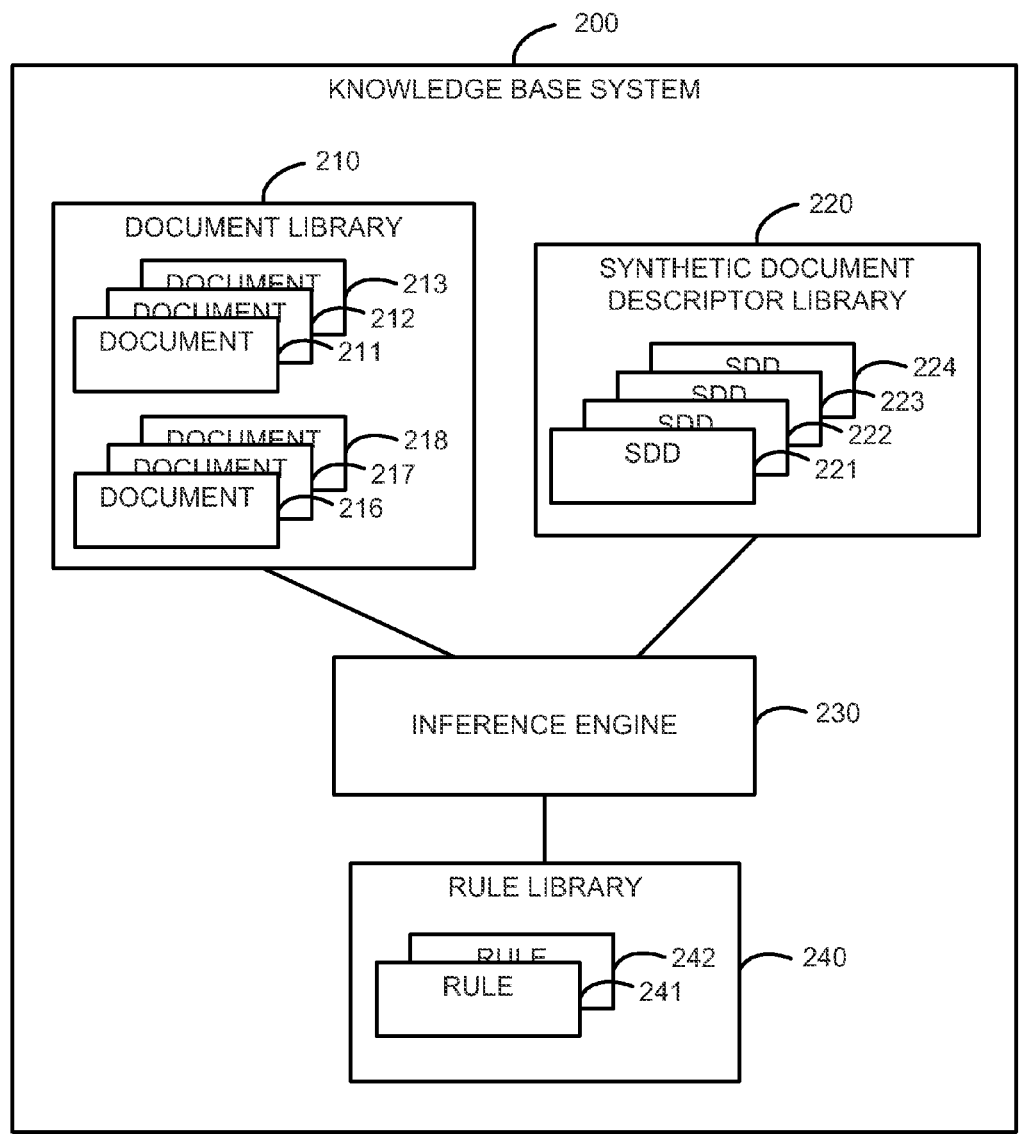
FIG. 2 is a schematic block diagram of a knowledge base system, according to an embodiment.

FIG. 2 is a schematic block diagram of a knowledge base system, according to an embodiment. Knowledge base system 200 illustrates components of a knowledge base system in addition to those discussed above in relation to FIG. 1. Knowledge base system 200 includes document library 210, synthetic document descriptor library 220, inference engine 230, and rule library 240. Inference engine 230 is in communication with document library 210, synthetic document descriptor library 220, and rule library 240.

Similar to the discussion of document library 135 in relation to FIG. 1 above, document library 210 is a database, hard drive, or other data store or storage service that stores documents within knowledge base system 200. In other words, documents accessible to knowledge base system 200 are stored at document library 210. Document library 210 can be local to knowledge base system 200. For example, document library 210 can be a hard drive of a computing device hosting an application implementing knowledge base system 200. Alternatively, documents library 210 can be remote from knowledge base system 200. For example, documents library 210 can be a data store accessible via a SAN or via a LAN at a NAS device. Moreover, document library 210 can be distributed across one or more local data stores and one or more remote data stores.

As illustrated in FIG. 2, document library 210 includes two groups of documents. The first group of documents includes documents 211, 212, and 213. The second group of documents includes documents 216, 217, and 218. The first group of documents (i.e., documents 211, 212, and 213) can be related to one topic or subject and the second group of documents (i.e., documents 216, 217, and 218) can be related to another topic or subject. Although groups of documents stored at document library 210 can be related to various topics, the documents within each group of documents can include related elements. In other words, although documents in one group of documents are related to one topic and documents in another group are related to another topic, the documents in each group of document can include elements related to a common topic. For example, one group of documents can be related to a notebook computer and another group of topics can be related to a desktop computer. Although these groups of documents are related to different topics, they can include related elements. For example, the notebook computer and the desktop computer can each host (or have installed) a common operating system. Each group of documents can include documents with elements related to the operating system. Thus, knowledge base system 200 can generate a synthetic document including elements related to the operating system of documents from each group of documents in response to a query related to the operating system received by knowledge base system 200.

Synthetic document descriptor library 220 is a database, hard drive, or other data store or storage service that stores synthetic document descriptors within knowledge base system 200. In other words, synthetic document descriptors accessible to knowledge base system 200 are stored at synthetic document descriptor library 220. Synthetic document descriptor library 220 can be local to knowledge base system 200. For example, synthetic document descriptor library 220 can be a hard drive of a computing device hosting an application implementing knowledge base system 200. Alternatively, synthetic document descriptor library 220 can be remote from knowledge base system 200. For example, synthetic document descriptor library 220 can be a data store accessible via a SAN or via a LAN at a NAS device. Moreover, synthetic document descriptor library 220 can be distributed across one or more local data stores and one or more remote data stores.

Figure 3:
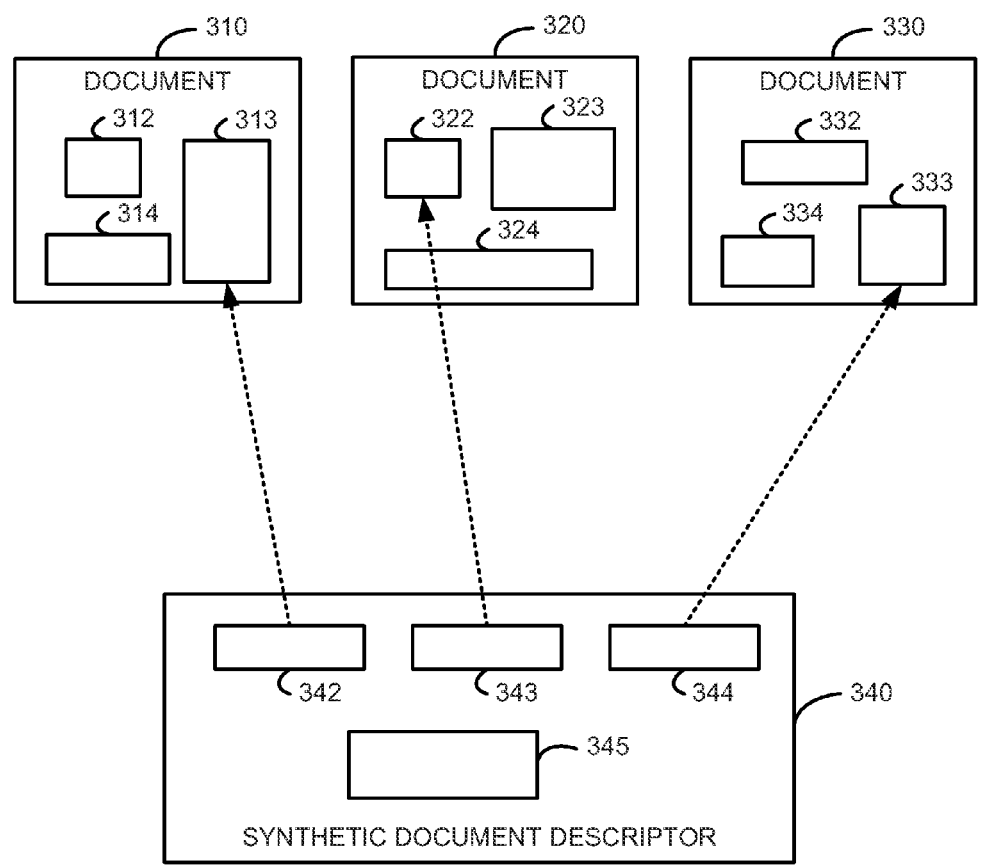
FIG. 3 is an illustration of a synthetic document descriptor and documents referenced by the synthetic document descriptor, according to an embodiment.

Synthetic document descriptors 221, 222, 223, and 224 are stored at synthetic document descriptor library 220. A synthetic document descriptor describes or defines a synthetic document. For example, a synthetic document descriptor can identify elements of documents that are included within a synthetic document. FIG. 3 is an illustration of a synthetic document descriptor and documents referenced by the synthetic document descriptor, according to an embodiment. Synthetic document descriptor 340 includes references to (or identifiers of) elements of documents. As illustrated in FIG. 3, synthetic document descriptor 340 includes references (or document element references) 342, 343, and 344. References 342, 343, and 344 are illustrative and a synthetic document descriptor can include more or fewer references than illustrated at synthetic document descriptor 340.

References 342, 343, and 344 can be any of a variety of references to elements of documents. For example, references 342, 343, and 344 can be memory addresses of locations of memory at which elements of documents are stored, a uniform resource identifier ("URI") of an element of a document, a filename of a document and section identifiers (e.g., line numbers, character numbers, time values, frame numbers, coordinates of a portion of an image, and/or other identifiers) of an element within that document, a filename of a document and a name or identifier of an element within that document, and/or another reference to or identifier of an element within a document.

Reference 342 points to (or references or identifies) element 313 of document 310. In addition to element 313, document 310 includes elements 312, and 314. Reference 343 points to (or references or identifies) element 322 of document 320. In addition to element 322, document 320 includes elements 323, and 324. Reference 344 points to (or references or identifies) element 333 of document 330. In addition to element 333, document 330 includes elements 332, and 334.

In addition to references 342, 343, and 344, synthetic document descriptor 340 includes identifier (or synthetic document descriptor identifier) 345. Identifier 345 is an identifier such as a name, number, URI, and/or other identifier that identifies synthetic document descriptor 340. Identifier 345 can be a globally unique identifier such that no other synthetic document descriptor includes an identifier having a common value with identifier 345. In some embodiments, identifier 345 can be an identifier that is unique within a knowledge base system and/or within a synthetic document descriptor library. References 342, 343, and 344 and identifier 345 can be implemented as, for example, data fields at which values representing reference to elements within documents and an identifier, respectively, are stored. Although not illustrated in FIG. 3, a synthetic document descriptor can include additional data fields such as multiple identifier data fields. For example, a synthetic document descriptor can include a numeric identifier (or identifier data field) and a textual identifier. Thus, the synthetic document descriptor can be identified by a number and/or a text string.

Synthetic document descriptors can be represented in any of a variety of formats. For example, a synthetic document descriptor can be a flat (or plain) text file in which each line includes a value associated with a reference to an element of a document or an identifier of a synthetic document descriptor. For example, the first three lines of the text file can include reference 342, 343, and 344, respectively, and the next line of the text file can include identifier 345. Alternatively, multiple synthetic document descriptors can be included in a single file. For example, data at each line of a text file can represent a synthetic document descriptor where references 342, 343, and 344 and identifier 345 are separated (or delimited) by tab symbols, comma symbols, and/or other symbols within that line. As another example, synthetic document descriptors can be represented by an XML document.

As a specific example, FIG. 4 is an illustration of an XML schema representing a synthetic document descriptor, according to an embodiment. XML schema 400 represents a synthetic document descriptor ("synthetic_document_descriptor") that includes a text name ("name") and a list of document element references ("document_element_reference"). Furthermore, each document element reference includes a text name, a path (e.g., a URI of a document), a start line number ("startLineNumber") at which the document element referenced by that document element reference begins within the document identified by "path," and a stop line number ("stopLineNumber") at which the document element referenced by that document element reference ends within the document identified by "path."

Referring to FIG. 2, rule library 240 is a database, hard drive, or other data store or storage service that stores rules within knowledge base system 200. In other words, rules accessible to knowledge base system 200 are stored at rule library 240. Rule library 240 can be local to knowledge base system 200. For example, rule library 240 can be a hard drive of a computing device hosting an application implementing knowledge base system 200. Alternatively, rule library 240 can be remote from knowledge base system 200. For example, rule library 240 can be a data store accessible via a SAN or via a LAN at a NAS device. Moreover, rule library 240 can be distributed across one or more local data stores and one or more remote data stores.

Figure 5:
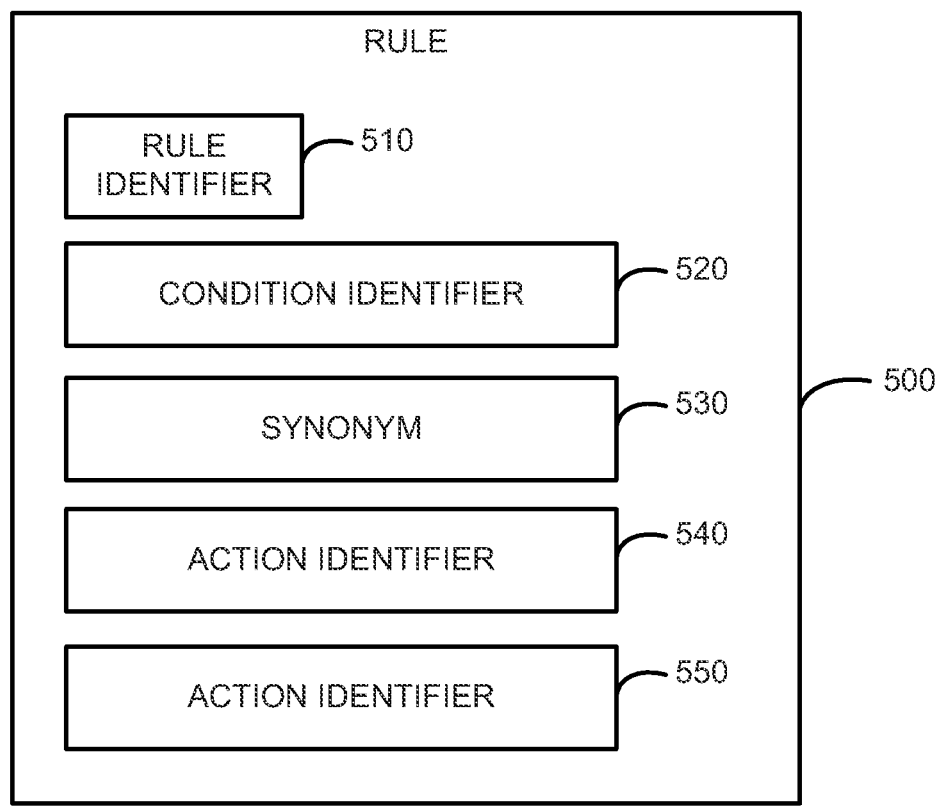
FIG. 5 is an illustration of a rule, according to an embodiment.

Rules 241 and 242 are stored at rule library 240. A rule describes or defines a condition and an action. For example, a rule can define an action to be invoked or taken when a query that satisfies the condition of that rule is received at knowledge base system 200. In other words, knowledge base system 200 can determine that a query is related to a particular rule if the condition for that rule is satisfied by the query and then execute the action of that rule. FIG. 5 is an illustration of a rule, according to an embodiment. As illustrated in FIG. 5, rule 500 includes a group of fields (or data fields) including fields for rule identifier 510, condition identifier 520, synonym 530, action identifier 540, and action identifier 550.

Rule identifier 510 is an identifier such as a name, number, URI, and/or other identifier that identifies rule 500. Rule identifier 510 can be a globally unique identifier such that no other rule includes an identifier having a common value with rule identifier 510. In some embodiments, rule identifier 510 can be an identifier that is unique within a knowledge base system and/or within a rule library. Although not illustrated in FIG. 5, a rule can include additional data fields such as multiple identifier data fields. For example, a rule can include a numeric identifier (or identifier data field) and a textual identifier. Thus, the synthetic document descriptor can be identified by a number and/or a text string.

Condition identifier 520 represents the condition to which rule 500 is related. Said differently, condition identifier 520 describes a condition that, when satisfied, triggers an action associated with action identifier 540 and/or action identifier 550. A condition can be, for example, a value that is satisfied when a query matching that value is received at a knowledge base system. For example, condition identifier 520 can be a textual string, a regular expression, a logical expression, a numeric value, and/or some other identifier of a condition. The condition associated with condition identifier 520 can be satisfied when a query that includes that textual string or numeric value or for which the regular expression or logical expression evaluates to a predefined value (e.g., a TRUE boolean value) is received at a knowledge base system.

Synonym 530 includes another identifier related to the condition associated with condition identifier 520. In other words, synonym 530 is a synonym or alternate value for condition identifier 520. Thus, an action associated with action identifier 540 and/or action identifier 550 can be triggered when synonym 530 or condition identifier 520 is satisfied. Such synonyms can be useful, for example, to eliminate or mitigate redundancy of rules within a knowledge base system. Said differently, rather than include multiple rules with different identifiers and a common action within a knowledge base system, a single rule with multiple synonyms (i.e., identifiers) and the common action can be included in a knowledge base system. Furthermore, when a rule is updated to include a different action (e.g., synthetic document descriptors are added to and/or removed from the rule), an update to the single rule updates the action for queries related to the identifier of that rule and all the synonyms related to that rule. In contrast, if multiple rules with different identifiers and a common action are included within a knowledge base system, each of the multiple rules is updated to update the action for queries related to the identifier of each of the multiple rules. In some embodiments, synonym 530 can include a list of synonyms or alternate values related to the condition associated with condition identifier 520, and an action associated with action identifier 540 and/or action identifier 550 can be triggered when any value stored at the list of synonym 530 is satisfied.

Action identifiers 540 and 550 include values that describe an action or operation that is invoked, taken, or performed when the condition associated with condition identifier 520 (or any synonym of condition identifier 520 stored at synonym 530) is satisfied. Action identifiers 540 and/or 550 can be explicit or implicit. For example, action identifier 540 and/or action identifier 550 can include an explicit command to invoke an action such as "generate synthetic document using synthetic document descriptor 1731." Such a command can be defined in a textual string (as illustrated in the previous example), can include machine instructions or code that can be interpreted by a processor to execute an action, can include parameters or arguments, and/or can include other descriptions of an action. Alternatively, action identifier 540 and/or action identifier 550 can include an implicit command to invoke an action such as "1731." A knowledge base system including a rule with such an action identifier can interpret this action identifier to mean that the synthetic document descriptor with the identifier included in this action identifier (here, 1731) should be used to generate a synthetic document. Said differently, a knowledge base system can include a default (or predetermined) command and an action identifier can include an input value such as a parameter or argument for that command. The input value is, thus, accessed by the knowledge base system to complete the command and subsequently execute the action.

Referring to FIG. 2, inference engine 230 is implemented as a hardware module and/or a software module. For example, inference engine can be implemented as application-specific circuitry and/or as a software module including instructions stored at a memory and executed at a processor in communication with the memory computing device such as a computer server. Inference engine 230 receives a query and selects a rule based on that query. For example, inference engine 230 can receive a query and access rules 241 and 242 within rule library 240 to determine whether the query satisfies a condition (i.e., matches or satisfies a condition identifier or synonym) of rule 241 or rule 242. More specifically, inference engine 230 can compare the query to the condition identifiers and synonyms of the rules within rule library 240. If the query (or a portion of the query) matches (or satisfies) a condition identifier or synonym of a rule in rule library 240, that rule can be selected.

After selecting a rule from rule library 240, inference engine 230 executes an action identified or described at an action identifier of that rule. For example, an action identifier can specify that inference engine 230 access one or more of synthetic document descriptors 221, 222, 223, or 224 within synthetic document descriptor library 220 and generate a synthetic document including elements of one or more of documents 211, 212, 213, 216, 217, and 218 identified (or referenced) by the one or more synthetic document descriptors accessed by inference engine 230. Inference engine 230 can then send the generated synthetic document to the client of knowledge base system 200 that provided the query.

If inference engine 230 is unable to select a rule from rule library 240 based on a query (e.g., if no condition of any rule at rule library 240 is satisfied by the query), inference engine 230 can send synthetic document descriptors from synthetic document descriptor library 220 to the client that provided the query. As will be discussed in more detail herein, a user of the client can determine which, if any, synthetic document descriptors are related to the query and send identifiers of those synthetic document descriptors to inference engine 230. Furthermore, a user of the client can define additional synthetic document descriptors and/or rules and provide these additional synthetic document descriptors and/or rules to inference engine 230. Thus, in addition to generating synthetic documents based on queries, inference engine 230 can receive additional synthetic document descriptors (or can generate additional synthetic document descriptors in response to information related to synthetic document descriptors received from a client) and add such synthetic document descriptors to synthetic document descriptor library 220. Furthermore, inference engine 230 can receive new rules (or can generate additional rules in response to information related to rule from a client) and add such rules to rule library 240.

Figure 6:
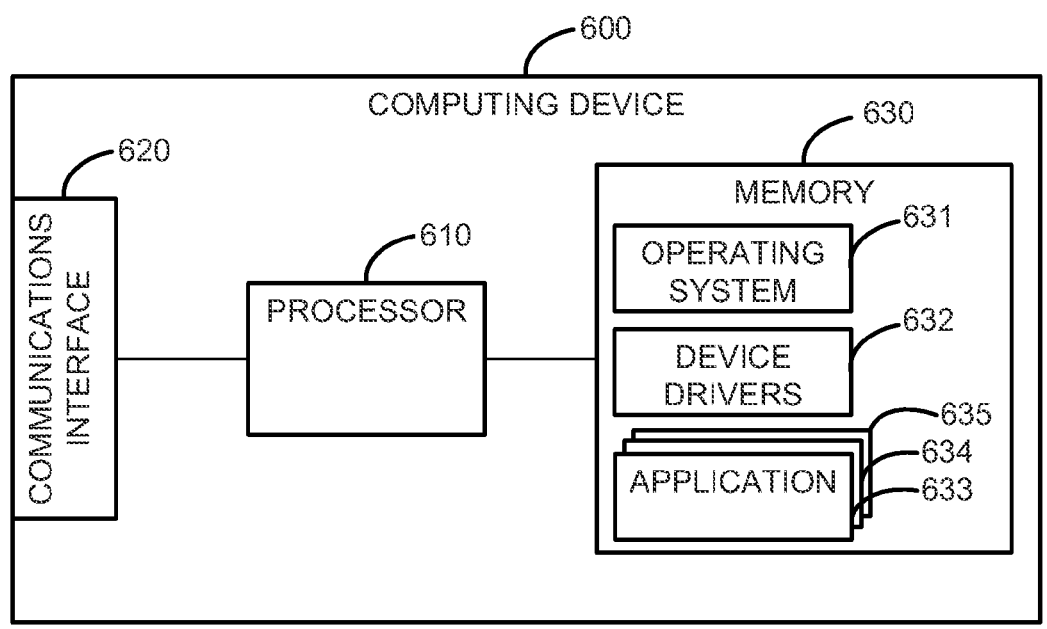
FIG. 6 is a schematic block diagram of a computing device, according to an embodiment.

Knowledge base system 200 includes one or more computing devices. In other words, document library 210, synthetic document descriptor library 220, inference engine 230, and rule library 240 can be a single computing devices or can include multiple interconnected (e.g., via communications links) computing devices. In some embodiments, document library 210, synthetic document descriptor library 220, inference engine 230, and rule library 240 can be hosted at one or more computing devices as software modules such as application programs and/or virtual machines. FIG. 6 is a schematic block diagram of a computing device, according to an embodiment. As illustrated in FIG. 6, computing device 600 includes communications interface 620, processor 610, and memory 630. Processor 610 is operatively coupled to communications interface 620 and memory 630. Typically, as illustrated in FIG. 6, memory 630 includes instructions or codes (e.g., computer codes or object codes) defining software modules that are executed by processor 610 during operation of computing device 610. For example, memory 630 includes instructions that define operating system 631, device drivers 632, and applications 633 (e.g., software application programs). In other words, operating system 631, device drivers 632, applications 633, and other software modules stored as instructions (not shown) at memory 630 and executed at processor 610 are hosted at computing device 600. Furthermore, data sets (not shown) such as messaging data sets and structured data sets can be stored within memory 630.

Communications interface 620 is an interface accessible to processor 610 to communicate with (i.e., transmit symbols representing data to and receive such symbols from) other processors and/or computing devices via a communications link. In other words, communications interface 620 can receive data from processor 610 and transmit symbols representing that data via a communications link. Moreover, communications interface 620 can receive symbols from other communications interfaces via a communications link and send data represented by those symbols to processor 610. For example, communications interface 620 can be a telephone network interface, a twisted-pair network interface, a coaxial network interface, a fiber-optic network interface, a wireless network interface such as a wireless local area network ("WLAN") or a cellular network, and/or some other network or communications interface.

Figure 7:
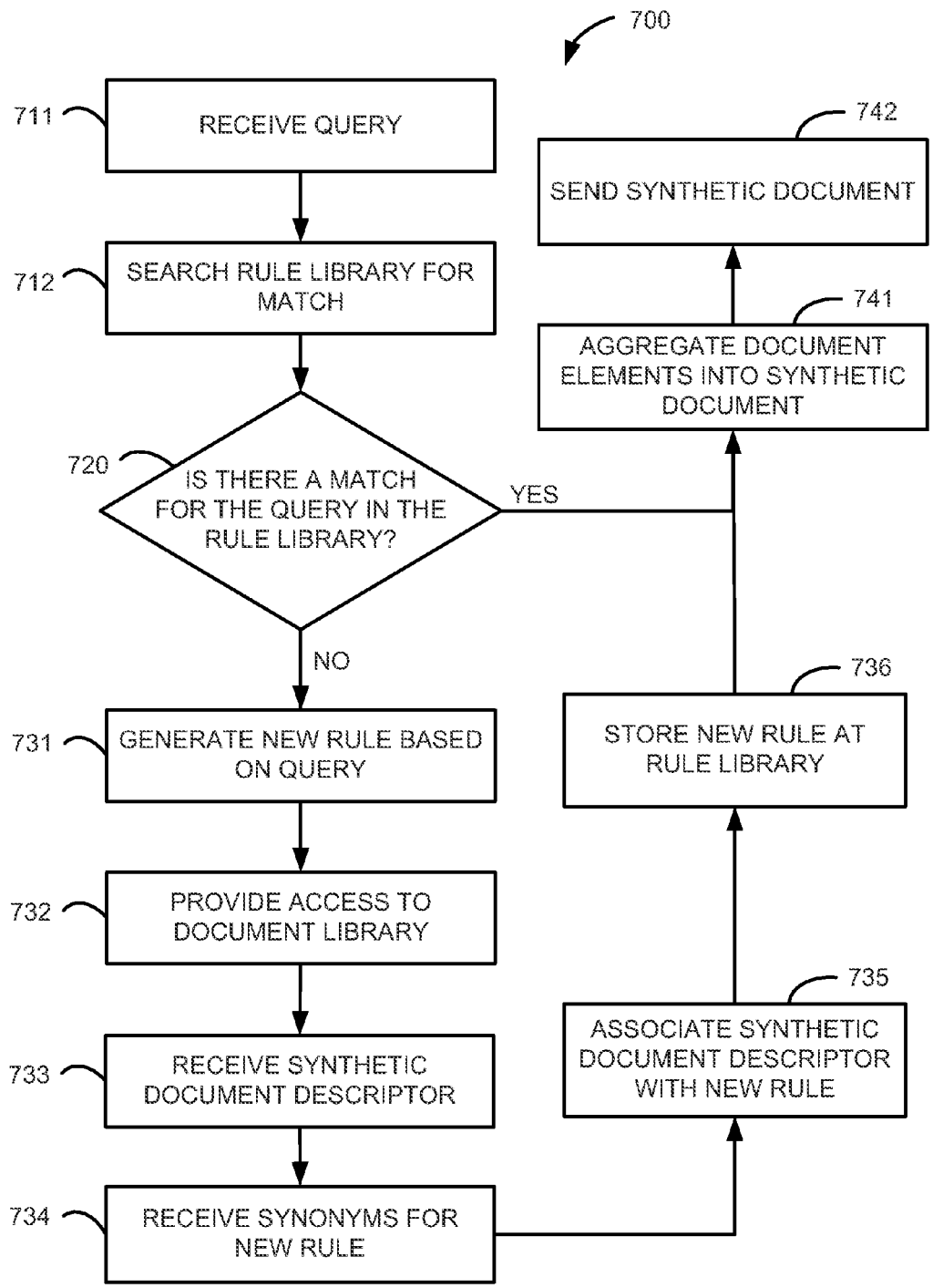
FIG. 7 is a flowchart of a process to generate a document descriptor, according to an embodiment.

FIG. 7 is a flowchart of a process to generate a document descriptor, according to an embodiment. Process 700 can be implemented as a hardware module and/or a software module. For example, process 700 can be implemented as application-specific circuitry or as a software module including instructions stored at a memory and executed at a processor in communication with the memory. As a specific example, process 700 can be implemented at an inference engine within a knowledge base system.

A query is received at, for example, an inference engine within a knowledge base system at block 711, and a rule library is searched for a rule that matches the query (i.e., a rule that has a condition satisfied by the query) at block 712. For example, a knowledge base system can include initial or default rules and those rules can be searched to determine if a rule matches the query before additional rules as described in more detail below. If there is a rule that matches the query within the rule library at block 720, the inference engine can execute an action included within the rule. For example, as illustrated in FIG. 7, an action of a rule can specify that elements of documents should be aggregated (or combined) to generate a synthetic document at block 741. The synthetic document is then sent (e.g., to a client that provided the query to the knowledge base system) at block 742. Thus, the client (or user of the client via the client) can submit a query and receive a synthetic document including information related to that query from a number of documents.

Returning to block 720, a rule library may not include a rule that matches (or includes a condition that is satisfied) each query that a client provides. Thus, a knowledge base system (or an inference engine within a knowledge base system) can define or generate new or additional rules if no rule in the rule library matches the query. As illustrated in FIG. 7, a new rule based on the query is generated at bock 731 if the rule library does not include a rule that matches the query. The new rule based on the query is defined such that the query matches that rule. For example, a text string (or portion thereof) included within the query can be included as a condition identifier of the new rule. In some embodiments, an inference engine can define a condition identifier within the new rule that includes a logical expression for which the query evaluates to a particular value (e.g., a TRUE boolean value).

The inference engine can then provide the client with access to a document library at block 732 to allow the client to define a synthetic document descriptor related to the query. For example, the interference engine can send the documents in the document library to the client and a user of the client can define a synthetic document descriptor including references to elements of those documents and send the synthetic document descriptor to the inference engine. In other words, the user of the client is able to browse the document library and select elements of the documents within the document library that are related to the query. For example, the knowledge base system (or the inference engine) can provide a web interface that is accessible via an Internet browser client controlled by the user of that client. The knowledge base system can generate a web page that includes links (or reference) to the documents within the document library and controls for accessing and selecting elements of those documents. In some embodiments, the client can be a purpose-built application that includes a view or window at which the knowledge base system can provide access to the documents in the document library.

Figure 8:
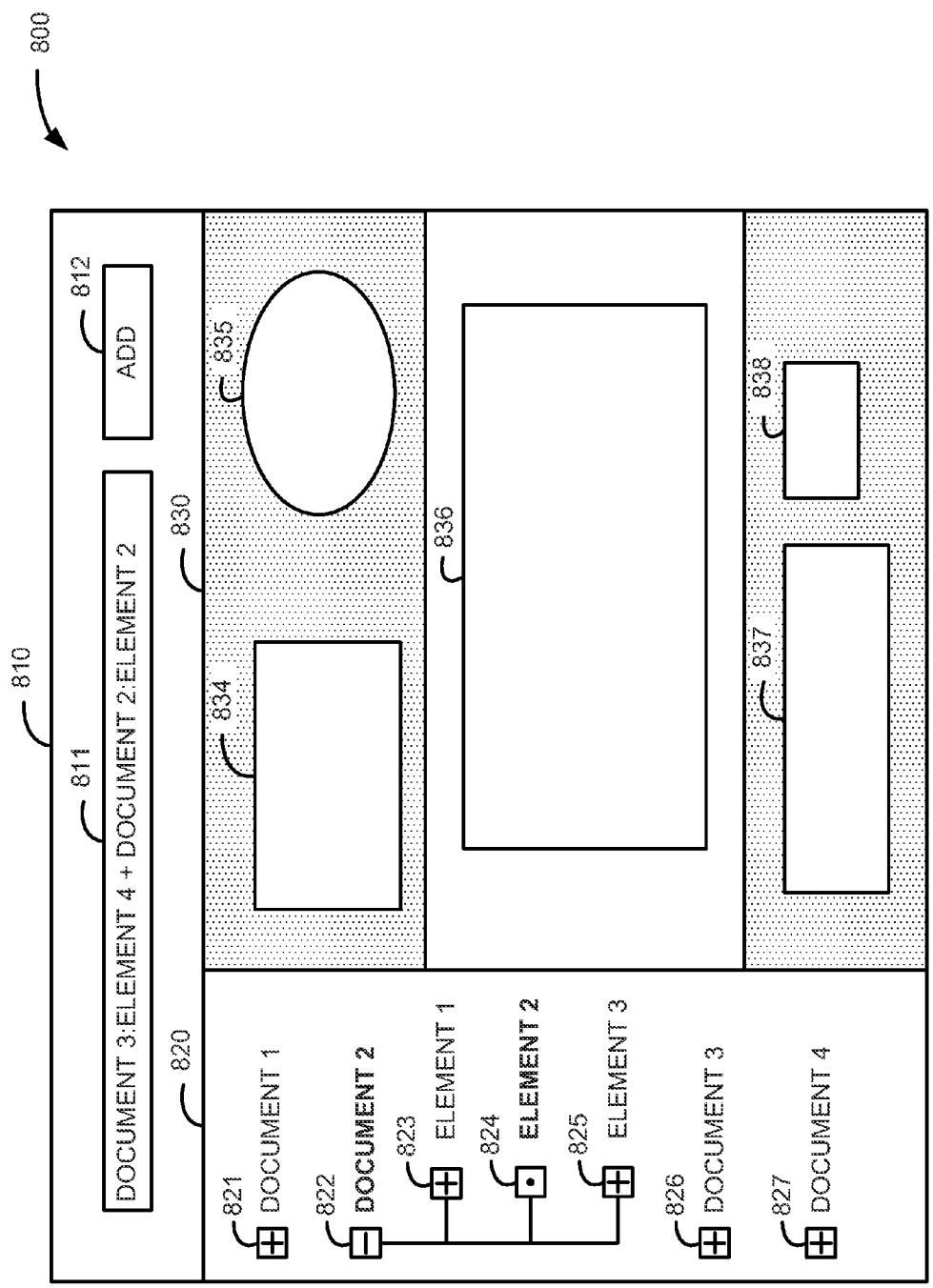
FIG. 8 is a block diagram of a user interface to define a synthetic document descriptor, according to an embodiment.

As a more specific example, FIG. 8 is a block diagram of a user interface to define a synthetic document descriptor, according to an embodiment. FIG. 8 can be, for example, a web page including multiple frames. Alternatively, FIG. 8 can be an application that includes the views or windows illustrated in FIG. 8. User interface 800 includes view portions 810, 820, and 830. View sections are, for example, frames, table elements or other sections within a web page, views, windows or other sections of an application, and/or other sections of a user interface.

View section 810 includes synthetic document descriptor display 811 and control 812. Synthetic document descriptor display 811 displays, identifies, or shows the document elements that are included within (or referenced by) the synthetic document descriptor that is being defined. Control 812, as illustrated in FIG. 8, can be activated by a user (e.g., by selecting control 812 with an input device such as a mouse) to add a document element to the synthetic document descriptor that is being defined.

View section 820 includes a list of documents included in a document library at a knowledge base system. As illustrated in FIG. 8, view section 820 includes a tree structure of the document library to aid navigation of the documents within the document library. Representations of the documents within the document library other than tree structures such as, for example, a folder and file representation in which folders are associated with documents and files within a folder are associated with elements of the document associated with that folder.

Controls 821, 822, 826, and 827 are associated with DOCUMENT 1, DOCUMENT 2, DOCUMENT 3, and DOCUMENT 4 within the document library. Controls 823, 824, and 825 are associated with ELEMENT 1, ELEMENT 2, and ELEMENT 3 of DOCUMENT 2. Controls 821, 822, 826, and 827 can be selected to display the documents of the document library. Furthermore, when controls 821, 822, 826, and 827 are activated by a user, the elements of the document associated with the activated control are identified to the user within view section 820 and are displayed to the user at viewer section 830. For example, when a user activates one of controls 821, 822, 826, and 827, a request can be generated at, for example, an application module implementing user interface 800 and send to a knowledge base system (or inference engine) and the knowledge base system can send the document (or a portion of that document) associated with that control to the application module implementing user interface 800. The request can include, for example, an identifier of the document such as a name or numeric identifier sent to the application module implementing user interface 800 by a knowledge base system. The application module implementing user interface 800 can receive the document and display the document to the user at, for example, view section 830. Alternatively, for example, one or more of the documents associated with controls 821, 822, 826, and 827 can be sent to an application module implementing user interface 800 before a user selects one or more of controls 821, 822, 826, and 827, and the application module implementing user interface 800 can display the document associated with the selected control in response to the selection.

The plus symbol ('+') at controls 821, 823, 825, 826, and 827 indicates that additional document elements are included within the document or element associated with those controls. In other words, controls 821, 823, 825, 826, and 827 can be activated to expand controls 821, 823, 825, 826, and 827 to show additional controls for document elements within view section 820. The minus symbol ("−") at control 822 indicates that DOCUMENT 2 is expanded and that the document elements of DOCUMENT 2 can be hidden or not displayed at view section 820 by activating control 822 to collapse control 822. The dot (".") at control 824 indicates that there are no additional document elements are included within ELEMENT 2.

View section 830 displays document elements of the selected document. Additionally, the selected document (and document element, if any is selected) can be highlighted (e.g., in bold or other formatted or colored text) within view section 820. Document elements ELEMENT 1, ELEMENT 2, and ELEMENT 3 of DOCUMENT 2 are displayed within view section 830. In some embodiments view section 830 can include a scroll functionality (not shown) if, for example, not all document elements of the selected document can be displayed simultaneously within view section 830. ELEMENT 1 includes document elements 834 and 835 and is displayed at view section 830. The area of document DOCUMENT 2 around and/or including document elements 834 and 835 can be colored, darkened, or otherwise set off from the selected document element within view section 830, as illustrated in FIG. 8. ELEMENT 2 includes document element 836 and is displayed at view section 830. ELEMENT 3 includes document elements 837 and 838 and is displayed at view section 830. The area of document DOCUMENT 2 around and/or including document elements 837 and 838 can be colored, darkened, or otherwise set off from the selected document element within view section 830, as illustrated in FIG. 8.

When a document element is selected (ELEMENT 2 of DOCUMENT 2 as illustrated in FIG. 8), control 812 can be activated to add that document element to the synthetic document descriptor that is being defined. As illustrated in FIG. 8, ELEMENT 4 of DOCUMENT 1 and ELEMENT 2 of DOCUMENT 2 are presently included within the synthetic document descriptor that is being defined.

User interface 800 can include additional controls and/or view sections than those illustrated in FIG. 8. For example, user interface 800 can include a control to remove a document element from the synthetic document descriptor that is being defined. Additionally, user interface 800 can include a control to submit or send the synthetic document descriptor that is being defined to a knowledge base system.

Referring to FIG. 7, after the user of the client has accessed the document library to determine which document elements are related to the query received at block 711, the client can send a synthetic document descriptor identifying those document elements that is received at block 733. In other words, the inference engine (or knowledge base system) receives a synthetic document descriptor that is related to the new rule generated at block 731. Additionally, the inference engine can store the synthetic document descriptor at a synthetic document descriptor library of a knowledge base system. In some embodiments, the inference engine can receive from the client one or more identifiers or references to elements of documents within the document library and can define (or generate) a synthetic document descriptor based on those identifiers. Thus, the client can send identifiers of the elements from documents in the document library that are related to the query and the inference engine can generate a synthetic document descriptor including those elements.

In addition to the synthetic document descriptor, the inference engine can also receive synonyms for the new rule at block 734. In other words, a client can provide synonyms of the query received at block 711 to the inference engine. For example, a user interface at the client and in communication with the inference engine can include an input field at which a user of the client can enter one or more synonyms, and the software module including the user interface can send the one or more synonyms to the inference engine.

The synthetic document descriptor received at block 733 is associated at block 735 with the new rule generated at block 731. For example, the synthetic document descriptor can be included or stored as an action of the new rule. As a more specific example, an action to generate a synthetic document including the elements referenced in the synthetic document descriptor can be defined at the new rule. Additionally, the synonyms received at block 734 can be associated (not shown) with the new rule. For example, the synonyms can be stored at one or more synonym fields of the new rule.

The new rule is then stored at the rule library at block 736. Thus, a match will exist in the rule library for subsequent queries that satisfy the new rule (or one of the synonyms for the new rule). A synthetic document is then generated at block 741 based on the synthetic document descriptor of the new rule. In other words, the action of the new rule can specify that elements of documents referenced in the synthetic document descriptor received at block 733 should be aggregated (or combined) to generate a synthetic document at block 741. The synthetic document is then sent (e.g., to the client that provided the query to the knowledge base system) at block 742. Thus, the client (or user of the client via the client) can submit a query, associate elements of documents in the document library with that query, and receive a synthetic document based on those elements of documents in the document library.

Process 700 can include blocks in addition to those illustrated in FIG. 7. Additionally, one or more blocks can be rearranged. For example, the new rule can be stored at the rule library when generated and later accessed to associate synonyms or a synthetic document descriptor with the new rule. Additionally, if more than one rule in the rule library matches (or is satisfied by) the query, the inference engine can send a list of rules to the client (e.g., at a user interface of the client) and the user of the client can select one of the rules or indicate that no rule in the list is acceptable to the user. If the user selected a rule, process 700 can proceed from block 720 to block 741 using the selected rule as discussed above. If the user indicated that no rule is acceptable, process 700 can proceed from block 720 to block 731 as discussed above. Furthermore, although process 700 is discussed above with reference to a knowledge base system, process 700 is applicable within other environments.

In some embodiments, a rule can be updated using, for example, a user interface similar to user interface illustrated in FIG. 8. For example, the user can receive the synthetic document sent at block 742 and can indicate to an inference engine via a client that the rule should be updated to generate a different synthetic document. The inference engine can then provide access to the document library as discussed above in relation to blocks 732, 733, and 734. The inference engine can then modify the action of the rule to refer to, for example, the synthetic document descriptor received from the client. In some embodiments, the synthetic document descriptor received from the client can be associated with the rule as an additional action. In some embodiments, the synthetic document descriptor received from the client can be associated with the rule as an action that replaces other actions such that a synthetic document that is generated in response to the rule is based on the synthetic document descriptor received from the client. The updated rule can then be stored at the rule library and blocks 741 and 742 can be repeated to generate and send a new synthetic document descriptor to the client.

Figure 9:
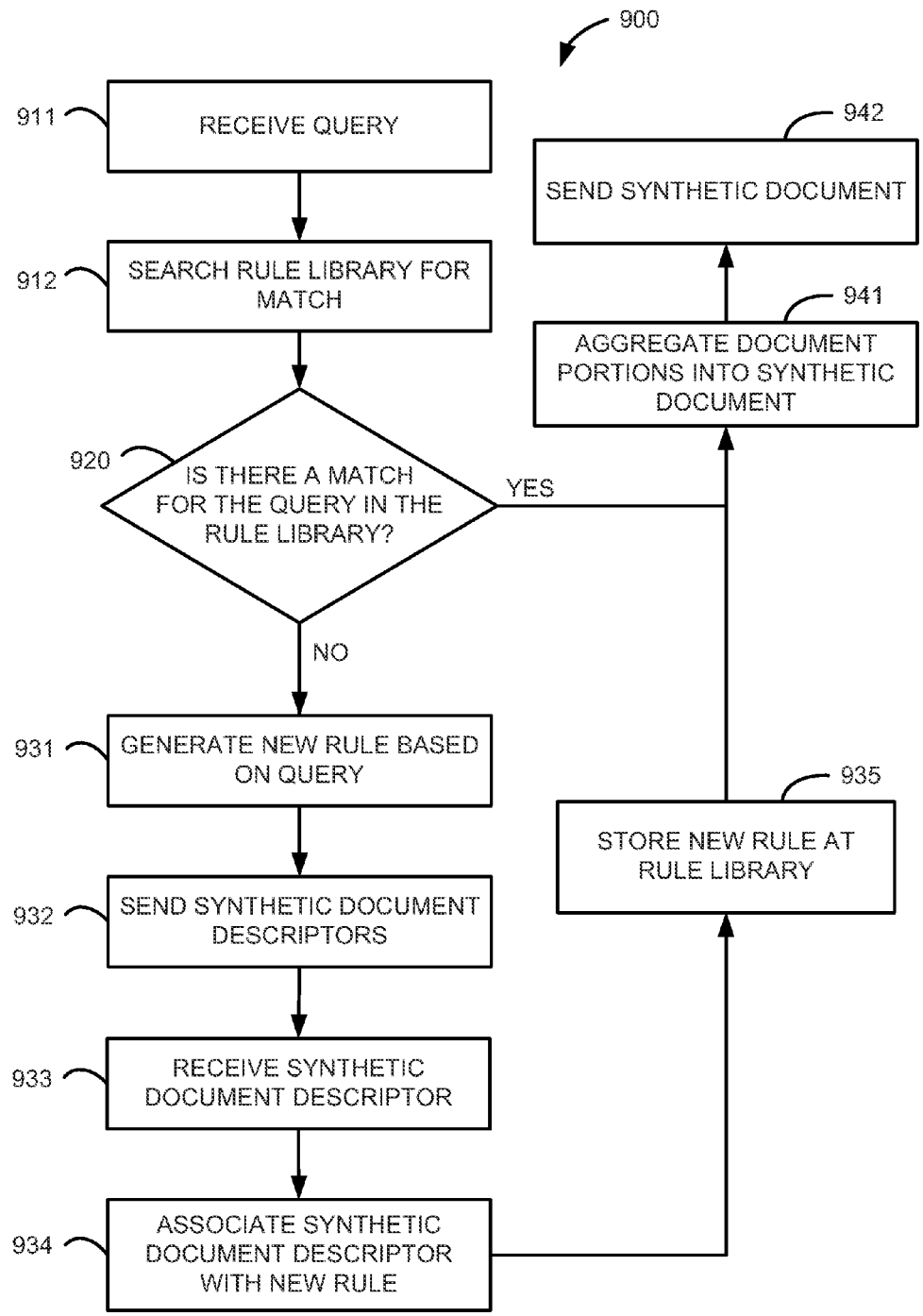
FIG. 9 is a flowchart of a process to generate a document descriptor, according to another embodiment.

FIG. 9 is a flowchart of a process to generate a document descriptor, according to another embodiment. Process 900 can be implemented as a hardware module and/or a software module. For example, process 900 can be implemented as application-specific circuitry or as a software module including instructions stored at a memory and executed at a processor in communication with the memory. As a specific example, process 900 can be implemented at an inference engine within a knowledge base system.

A query is received at, for example, an inference engine within a knowledge base system at block 911, and a rule library is searched for a rule that matches the query (i.e., a rule that has a condition satisfied by the query) at block 912. If there is a rule that matches the query within the rule library at block 920, the inference engine can execute an action included within the rule. For example, as illustrated in FIG. 9, an action of a rule can specify that elements of documents should be aggregated (or combined) to generate a synthetic document at block 941. Alternatively, the elements of documents that should be aggregated to generate the synthetic document can be identified in a synthetic document descriptor identified by (or associated with) an action of the rule. The synthetic document is then sent (e.g., to a client that provided the query to the knowledge base system) at block 942. Thus, the client (or user) can submit a query and receive a synthetic document including information related to that query from a number of documents.

Returning to block 920, a rule library may not include a rule that matches (or includes a condition that is satisfied) each query that a client provides. Thus, a knowledge base system (or an inference engine within a knowledge base system) can define or generate new or additional rules if no rule in the rule library matches the query. As illustrated in FIG. 9, a new rule based on the query is generated at bock 931 if the rule library does not include a rule that matches the query. The new rule based on the query is defined such that the query matches that rule. For example, a text string (or portion thereof) included within the query can be included as a condition identifier of the new rule. In some embodiments, an inference engine can define a condition identifier within the new rule that includes a logical expression for which the query evaluates to a particular value (e.g., a TRUE boolean value).

The inference engine can then send a group of synthetic document descriptors to the client at block 932 to allow the client to select a synthetic document descriptor related to the query. For example, the interference engine can send all the synthetic document descriptors to the client, and a user of the client can select a synthetic document descriptor including references to elements of those documents using a user interface of the client. The user interface can include view sections (similar to those illustrated in FIG. 8) that allow the user to select synthetic document descriptors and view the elements of documents referenced by those synthetic document descriptors. Additionally, the user interface can include a view section that displays an identifier such as a textual identifier and/or a numeric identifier of a synthetic document descriptor.

In some embodiments, a subset of the synthetic document descriptors included at a synthetic document descriptor library of a knowledge base system is sent to the client. For example, an inference engine can select a subset of synthetic document descriptors stored at a synthetic document descriptor library based on textual identifiers (or descriptions) of those synthetic document descriptors and the query. As an example, the interference engine can send to the client the synthetic document descriptors stored at a synthetic document descriptor library that are similar to the query received at block 911 (e.g., include words, phrases, or symbols that are included in the query).

The user of the client is thus able to browse the synthetic document descriptors and select one or more synthetic document descriptors that are related to the query and send those synthetic document descriptors (or identifiers of those synthetic document descriptors) to the inference engine. For example, the knowledge base system (or the inference engine) can provide a web interface that is accessible via an Internet browser client controlled by the user of that client. The knowledge base system can generate a web page that includes links (or reference) to the synthetic document descriptors within the synthetic document descriptors library and controls for accessing and selecting those synthetic document descriptors. The web page can also include a control for sending to the knowledge base system an indication (e.g., a synthetic document descriptor or an identifier of a synthetic document descriptor) that a particular synthetic document descriptor should be associated with the new rule generated at block 931. In some embodiments, the client includes a purpose-built application to access the knowledge base system and that includes a view or window at which the knowledge base system can provide access to the synthetic document descriptors within the synthetic document descriptors library.

After the client has accessed the synthetic document descriptor library to select synthetic document descriptors within the synthetic document descriptors library that are related to the query received at block 911, the client can send one or more synthetic document descriptors that are received at block 933. In other words, the inference engine (or knowledge base system) receives synthetic document descriptors that are related to the new rule generated at block 931. In some embodiments, the client sends identifiers of the synthetic document descriptors within the synthetic document descriptors library that are related to the query and the inference engine can access those synthetic document descriptors within the synthetic document descriptors library based on those identifiers.

A synthetic document descriptor received at block 933 is associated at block 934 with the new rule generated at block 931. For example, the synthetic document descriptor can be included or stored as an action of the new rule. As a more specific example, an action to generate a synthetic document including the elements referenced in the synthetic document descriptor can be defined at the new rule. If multiple synthetic document descriptors are received at block 933, block 934 can be repeated for each synthetic document descriptor.

The new rule is then stored at the rule library at block 935. Thus, a match will exist in the rule library for subsequent queries that satisfy the new rule (or one of the synonyms for the new rule). A synthetic document is then generated at block 941 based on the synthetic document descriptor of the new rule. In other words, the action of the new rule can specify that elements of documents referenced in the synthetic document descriptor received at block 933 should be aggregated (or combined) to generate a synthetic document at block 941. The synthetic document is then sent (e.g., to the client that provided the query to the knowledge base system) at block 942. Thus, the client (or user) can submit a query, associate elements of documents in the document library with that query, and receive a synthetic document based on those elements of documents in the document library.

Process 900 can include blocks in addition to those illustrated in FIG. 9. Additionally, one or more blocks can be rearranged. For example, in addition to the synthetic document descriptor, the inference engine can also receive synonyms for the new rule. In other words, a client can provide synonyms of the query received at block 911 to the inference engine. For example, a user interface at the client and in communication with the inference engine can include an input field at which a user of the client can enter one or more synonyms, and the client can send the one or more synonyms to the inference engine. The synonyms can then be associated with the new rule. For example, the synonyms can be stored at one or more synonym fields of the new rule. Furthermore, although process 900 is discussed above with reference to a knowledge base system, process 900 is applicable within other environments.

In some embodiments, rather than select a synthetic document descriptor from the synthetic document descriptor library, a user of the client can modify or update a synthetic document descriptor from the synthetic document descriptor. In other words, the inference engine can provide access to both the synthetic document descriptor library and the document library and the user can remove and/or add document elements from a synthetic document descriptor. For example, the user of the client can access a user interface similar to user interface 800 illustrated in FIG. 8 to view elements of documents that are included within a document library and/or referenced by a synthetic document descriptor, to add elements of documents to a list of elements of documents referenced by a synthetic document descriptor, to remove elements of documents from a list of elements of documents referenced by a synthetic document descriptor, and/or to send a modified synthetic document descriptor to the inference engine. The inference engine can then receive the synthetic document descriptor and store the modified synthetic document descriptor at the synthetic document descriptor library.

Furthermore, if the one or more synthetic document descriptors received at block 933 are associated with (e.g., referenced by an action of) a rule within a rule library of the knowledge base system, a synonym (or synonym value) can be defined at that rule such that the query received at block 911 matches or satisfies that synonym. For example, a text string (or portion thereof) included within the query can be included as a synonym of that rule. In some embodiments, an inference engine can define a synonym within that rule that includes a logical expression for which the query evaluates to a particular value (e.g., a TRUE boolean value). Thus, the new rule generated at block 931 can be discarded and a synonym satisfied by the query can be added to an existing rule such that the existing rule is selected if the query is later received by the knowledge base system.

Figure 10:
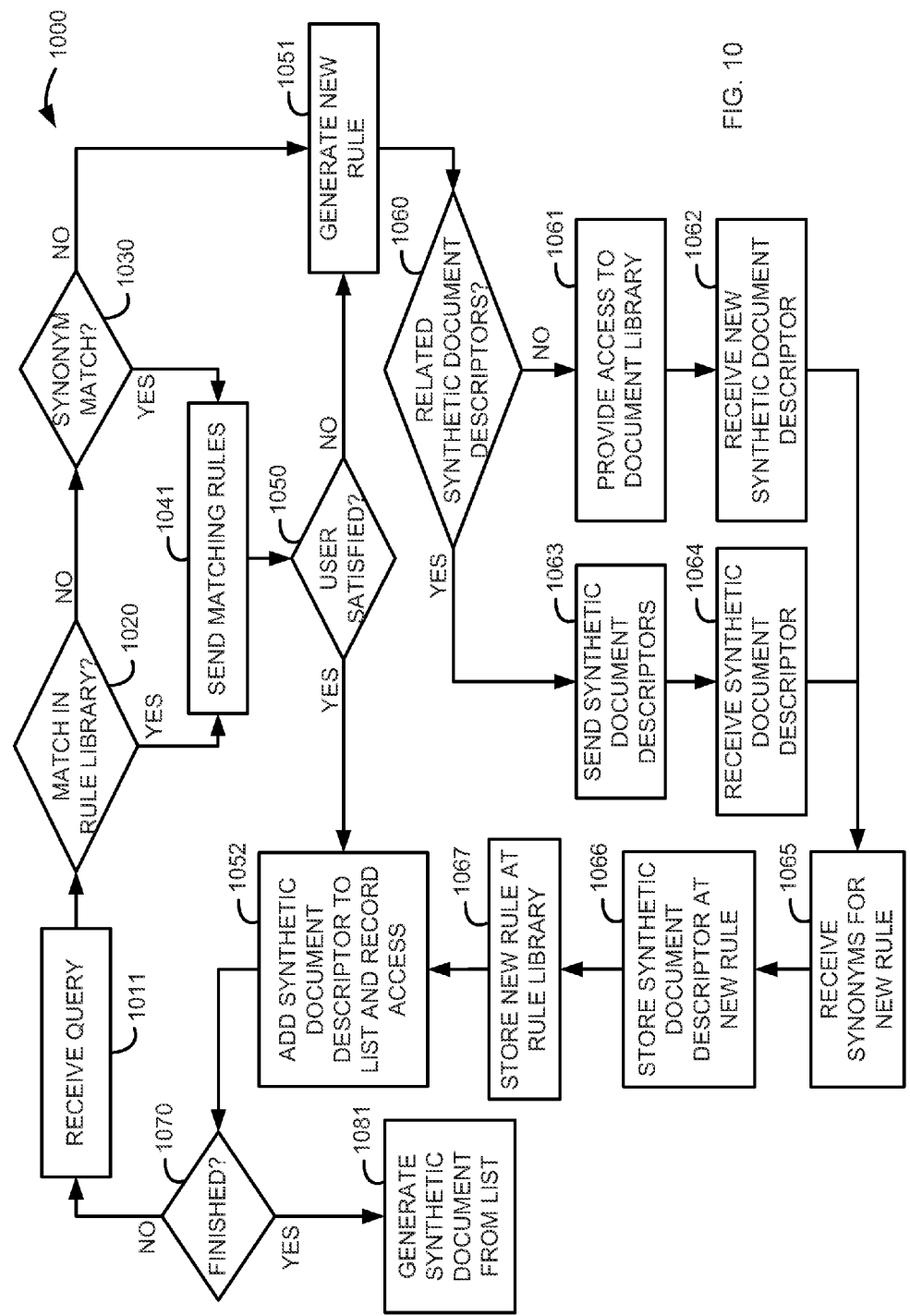
FIG. 10 is a flowchart of a process to generate a document descriptor, according to another embodiment.

FIG. 10 is a flowchart of a process to generate a synthetic document, according to another embodiment. Process 1000 can be implemented as a hardware module and/or a software module. For example, process 1000 can be implemented as application-specific circuitry or as a software module including instructions stored at a memory and executed at a processor in communication with the memory. As a specific example, process 1000 can be implemented at an inference engine within a knowledge base system.

A query is received at, for example, an inference engine within a knowledge base system at block 1011, and a rule library is searched for rules that match the query (i.e., rules that have a condition satisfied by the query) at block 1012. If rules within the rule library match the query, the inference engine can send a list of rules to the client (e.g., at a user interface of the client) at 1041 and the user of the client can select one or more of the rules or indicate that no rule in the list is acceptable to the user. Alternatively, if there is no rule within the rule library that matches the query, rules that include synonyms related to the query at block 1030 can be sent to the client at block 1041.

In some embodiments, the rules sent to the client can be ordered based on a ranking of the rules. For example, the rules that are most frequently accessed or used to generate synthetic documents (i.e., the rules with actions that are most frequently invoked) can be sent first to the client and/or can be displayed first within a list including the matching rules. That is, the rules that are most frequently accessed or used to generate synthetic documents can have ranking values that are greater than the ranking values of rules that are less frequently accessed or used to generate synthetic documents. In some embodiments, the rules that have been most recently accessed or used to generate synthetic documents (i.e., the rules with actions that have been most recently invoked) can be sent first to the client and/or can be displayed first within a list including the matching rules. In other words, the rules that have been most recently accessed or used to generate synthetic documents can have ranking values that are greater than the ranking values of the rules that have been less recently accessed or used to generate synthetic documents. Furthermore, in some embodiments, rules that have not been accessed frequently and/or recently can be deprecated and set off (e.g., different color, different font, etc.) from the other matching rules, and/or can not be sent to the client. Said differently, rules that have not been accessed frequently and/or recently can have ranking values that indicate such rules should not be sent to the client. For example, rules that have not been accessed to generate a synthetic document in the most recent 10 months (or some other period) can be deprecated and provided with a notation to the client indicating that these rules may no longer be useful. Additionally, rules that have not been updated (e.g., synonyms added to the rules) recently can be deprecated.

At 1050, if the user is satisfied by the rules (e.g., has selected at least one rule), process 1000 can execute the actions of the selected rules. In some embodiments, the user of the client can provide synonyms for a selected rule via the client to the inference engine.

As illustrated in FIG. 10, process 1000 can proceed from block 1050 to block 1052 and add synthetic document descriptors to a list of synthetic document descriptors that will be used to generate a synthetic document based on the rules selected by the user. Additionally, the inference engine can record that the rules and/or synthetic document descriptors were accessed (e.g., selected and included in the list, respectively) to monitor or track usage statistics for the rules and/or synthetic document descriptors.

If a user of the knowledge base system (or inference engine) has indicated that additional queries will not be submitted at block 1070, process 1000 can complete and a synthetic document is generated from the list of synthetic document descriptors at block 1081. The synthetic document can then be sent, for example, to the client that provided the query to the knowledge base system. Thus, the client (or user of the client via the client) can submit a query, select a rule associated with that query, and receive a synthetic document based on elements of documents in document library that are associated with the rule or an action of the rule.

Alternatively, if additional queries will be entered, process 1000 can return to block 1011 to receive additional queries. For example, an action to a rule can be to invoke another rule. Thus, process 1000 can proceed from block 1070 to block 1010 where the query is an identifier of the rule included as the action a rule sent to the user at block 1041. In other words, a rule included as an action to another rule can be invoked by using the identifier of the included rule as a query. Moreover, if an identifier of a synthetic document descriptor is included as an action to a rule, that identifier of the synthetic document descriptor can be used as a query at block 1011. Said differently, an instance (or iteration) of process 1000 can be executed at an inference engine to search for rules related to the identifier of a synthetic document descriptor that is invoked as an action to a rule identified in a prior instance (or iteration) of process 1000.

If the user indicated that no rule is acceptable at 1050 or if there is no rule within the rule library that matches the query at block 1020 and there is no synonym of the rules within the rule library that matches the query at block 1030, process 1000 can proceed to block 1051 at which a new rule is generated based on the query. The new rule based on the query is defined such that the query matches that rule. For example, a text string (or portion thereof) included within the query can be included as a condition identifier of the new rule. In some embodiments, an inference engine can define a condition identifier within the new rule that includes a logical expression for which the query evaluates to a particular value (e.g., a TRUE boolean value).

The inference engine can then determine whether the synthetic document descriptor library includes synthetic document descriptors that are related to the query. For example, an inference engine can select a subset of synthetic document descriptors stored at a synthetic document descriptor library based on textual identifiers (or descriptions) of those synthetic document descriptors and the query. As a more specific example, the interference engine can send to the client at block 1063 the synthetic document descriptors stored at a synthetic document descriptor library that are similar to the query received at block 1011 (e.g., include words, phrases, or symbols that are included in the query).

If there are no synthetic document descriptors that are related to the query, the inference engine can then provide the client with access to a document library at block 1061 to allow the client to define a synthetic document descriptor related to the query. For example, the interference engine can send the documents in the document library to the client and the user of the client can define a synthetic document descriptor including references to elements of those documents and send the synthetic document descriptor to the inference engine. In other words, the user of the client is able to browse the document library and select elements of the documents within the document library that are related to the query. For example, the knowledge base system (or the inference engine) can provide a web interface that is accessible via an Internet browser client controlled by the user of that client. The knowledge base system can generate a web page that includes links (or reference) to the documents within the document library and controls for accessing and selecting elements of those documents. In some embodiments, the client can be a purpose-built application to access the knowledge base system and that includes a view or window at which the knowledge base system can provide access to the documents in the document library. As a specific example, a user interface as illustrated in FIG. 8 can be used at the client to access documents at a document library.

After the user of the client has accessed the document library to determine which document elements are related to the query received at block 1011, the client can send a synthetic document descriptor identifying those document elements that is received at block 1062. In other words, the inference engine (or knowledge base system) receives a synthetic document descriptor that is related to the new rule generated at block 1051. In some embodiments, the inference engine can receive from the client one or more identifiers or references to elements of documents within the document library and can define (or generate) a synthetic document descriptor. Thus, the client can send identifiers of the elements from documents in the document library that are related to the query and the inference engine can generate a synthetic document descriptor referencing those elements. Additionally, the synthetic document descriptor can be stored at a synthetic document descriptor library of a knowledge base system including the inference engine.

In addition to the synthetic document descriptor, the inference engine can also receive synonyms for the new rule at block 1065. In other words, a client can provide synonyms of the query received at block 1011 to the inference engine. For example, a user interface at the client and in communication with the inference engine can include an input field at which a user of the client can enter one or more synonyms, and the software module including the user interface can send the one or more synonyms to the inference engine.

The synthetic document descriptor received at block 1062 is associated at block 1066 with the new rule generated at block 1051. For example, the synthetic document descriptor can be included or stored as an action of the new rule. As a more specific example, an action to generate a synthetic document including the elements referenced in the synthetic document descriptor can be defined at the new rule. Additionally, the synonyms received at block 1065 can be associated (not shown) with the new rule. For example, the synonyms can be stored at one or more synonym fields of the new rule.

The new rule is then stored at the rule library at block 1067. Thus, a match will exist in the rule library for subsequent queries that satisfy the new rule (or one of the synonyms for the new rule). Process 1000 then proceeds at block 1052 as discussed above.

Referring to block 1060, if the synthetic document descriptor library does include synthetic document descriptors that are related to the query received at block 1011, process 1000 proceeds from block 1060 to block 1063. The inference engine sends a group of synthetic document descriptors to the client at block 1063 to allow the client to select a synthetic document descriptor related to the query. In other words, the inference engine can select a subset of synthetic document descriptors stored at a synthetic document descriptor library based on textual identifiers (or descriptions) of those synthetic document descriptors and the query. As an example, the interference engine can send to the client the synthetic document descriptors stored at a synthetic document descriptor library that are similar to the query received at block 1011 (e.g., include words, phrases, or symbols that are included in the query).

The interference engine can send the synthetic document descriptors to the client, and the user of the client can select a synthetic document descriptor including references to elements of those documents using a user interface of the client. The user interface can include view sections (similar to those illustrated in FIG. 8) that allow the user to select synthetic document descriptors and view the elements of documents referenced by those synthetic document descriptors. Additionally, the user interface can include a view section that displays an identifier such as a textual identifier and/or a numeric identifier of a synthetic document descriptor.

The user of the client is thereby able to browse the synthetic document descriptors and select one or more synthetic document descriptors that are related to the query and send those synthetic document descriptors (or identifiers of those synthetic document descriptors) to the inference engine. For example, the knowledge base system (or the inference engine) can provide a web interface that is accessible via an Internet browser client controlled by the user of that client. The knowledge base system can generate a web page that includes links (or reference) to the synthetic document descriptors within the synthetic document descriptors library and controls for accessing and selecting those synthetic document descriptors. The web page can also include a control for sending to the knowledge base system an indication (e.g., a synthetic document descriptor or an identifier of a synthetic document descriptor) that a particular synthetic document descriptor should be associated with the new rule generated at block 1051. In some embodiments, the client includes a purpose-built application to access the knowledge base system and that includes a view or window at which the knowledge base system can provide access to the synthetic document descriptors within the synthetic document descriptors library.

In some embodiments, the synthetic document descriptors sent to the client can be ordered based on a ranking or aging of the synthetic document descriptors. For example, the synthetic document descriptors that are most frequently accessed or used to generate synthetic documents can be sent first to the client and/or can be displayed first within a list including the synthetic document descriptors. That is, the synthetic document descriptors that are most frequently accessed or used to generate synthetic documents can have a relatively (i.e., to other synthetic document descriptors) high ranking value and are sent or displayed first to a client in response to that ranking value. In some embodiments, the synthetic document descriptors that have been most recently accessed or used to generate synthetic documents can be sent first to the client and/or can be displayed first within a list including the synthetic document descriptors. Said differently, the synthetic document descriptors that have been most recently accessed or used to generate synthetic documents can have a relatively high ranking value and are sent or displayed first to a client in response to that ranking value. Furthermore, in some embodiments, synthetic document descriptors that have not been accessed frequently and/or recently can be deprecated and set off (e.g., different color, different font, etc.) from the other synthetic document descriptors, and/or can not be sent to the client. For example, synthetic document descriptors that have not been accessed to generate a synthetic document in the most recent three years (or some other period) can be deprecated (i.e., assigned a relatively low or a lowest ranking value) and provided with a notation to the client indicating that these synthetic document descriptors may no longer be useful.

After the client has accessed the synthetic document descriptor library to select synthetic document descriptors within the synthetic document descriptors library that are related to the query received at block 1011, the client can send one or more synthetic document descriptors that are received at block 1064. In other words, the inference engine (or knowledge base system) receives synthetic document descriptors that are related to the new rule generated at block 1051. In some embodiments, the client sends identifiers of the synthetic document descriptors within the synthetic document descriptors library that are related to the query and the inference engine can access those synthetic document descriptors within the synthetic document descriptors library. Process 1000 can then proceed to block 1065 as discussed above.

Process 1000 can include blocks in addition to those illustrated in FIG. 10. Additionally, one or more blocks can be rearranged. Furthermore, although process 1000 is discussed above with reference to a knowledge base system, process 1000 is applicable within other environments.

Some embodiments include a processor and a related processor-readable medium having instructions or computer code thereon for performing various processor-implemented operations. Such a processor can be a general-purpose processor or an application-specific process and can be implemented as a hardware module and/or a software module. A hardware module can be, for example, a microprocessor, a microcontroller, an application-specific integrated circuit ("ASIC"), a programmable logic device ("PLD") such as a field programmable gate array ("FPGA"), and/or other electronic circuits that perform operations. A software module can be, for example, instructions, commands, and/or codes stored at a memory and executed at another processor. Such a software module can be defined using one or more programming languages such as Java™, C++, C, an assembly language, a hardware description language, and/or another suitable programming language. For example, a processor can be a virtual machine hosted at a computer server including a microprocessor and a memory.

In some embodiments, a processor can include multiple processors. For example, a processor can be a microprocessor including multiple processing engines (e.g., computation, algorithmic or thread cores). As another example, a processor can be a computing device including multiple processors with a shared clock, memory bus, input/output bus, and/or other shared resources. Furthermore, a processor can be a distributed processor. For example, a processor can include multiple computing devices, each including a processor, in communication one with another via a communications link such as a computer network.

Examples of processor-readable media include, but are not limited to: magnetic storage media such as a hard disk, a floppy disk, and/or magnetic tape; optical storage media such as a compact disc ("CD"), a digital video disc ("DVDs"), a compact disc read-only memory ("CD-ROM"), and/or a holographic device; magneto-optical storage media; non-volatile memory such as read-only memory ("ROM"), programmable read-only memory ("PROM"), erasable programmable read-only memory ("EPROM"), electronically erasable read-only memory ("EEPROM"), and/or FLASH memory; and random-access memory ("RAM"). Examples of computer code include, but are not limited to, micro-code or micro-instructions, machine instructions, such as produced by a compiler, and files containing higher-level instructions that are executed by a computer using an interpreter. For example, an embodiment may be implemented using Java™, C++, or other object-oriented programming language and development tools. Additional examples of computer code include, but are not limited to, control signals, encrypted code, and compressed code.

While certain embodiments have been shown and described above, various changes in form and details may be made. For example, some features of embodiments that have been described in relation to one embodiment and/or process at a registration module can be useful at a location registry or network service element. More specifically, for example, processes described in relation to a registration module can be implemented at a location registry. In other words, processes, features, and/or properties of various embodiments described in relation to one element of a network service (e.g., a registration module, a location registry, or network service element) can be related (e.g., a process performed or a feature existing at) another element of the network service. Furthermore, it should be understood that the systems and methods described herein can include various combinations and/or sub-combinations of the components and/or features of the different embodiments described. Thus, features described with reference to one or more embodiments can be combined with other embodiments described herein.

What is claimed is:

1. A method to modify a knowledge base system, comprising:
receiving a query via a communications link;
generating a new rule in response to a determination that a rule library does not include a rule associated with the query, the new rule having a condition identifier field and an action identifier field, the condition identifier field of the new rule having a value associated with the query;
receiving, after the determination, a synthetic document descriptor via the communications link, the synthetic document descriptor including a first reference to a portion of a first document and a second reference to a portion of a second document;
storing a value associated with the synthetic document descriptor at the action identifier field of the new rule; and
storing the new rule at the rule library.

2. The method of claim 1, wherein the query is a first query, the method further comprising:
receiving a second query associated with the first query via the communications link;
selecting the new rule at the rule library based on the second query; and
defining a synthetic document based on the value of the action identifier of the new rule, the synthetic document including the portion of the first document and the portion of the second document.

3. The method of claim 1, further comprising:
receiving, before the storing the new rule, a synonym of the query via the communications link; and
storing, before the storing the new rule, the synonym at the new rule.

4. The method of claim 1, wherein the query is a first query, the method further comprising:
receiving a second query including a synonym of the first query via the communications link;
determining that the rule library does not include a rule associated with the second query;
receiving an indication that the synonym is related to the first query via the communications link; and
storing the synonym at the new rule.

5. The method of claim 1, wherein the query is a first query, the method further comprising:
receiving a synonym of the first query via the communications link;
storing the synonym at the new rule;
receiving a second query including the synonym of the first query via the communications link;
selecting the new rule at the rule library based on the synonym; and
defining a synthetic document based on the value of the action identifier of the new rule, the synthetic document including the portion of the first document and the portion of the second document.

6. The method of claim 1, further comprising:
sending a portion of a first synthetic document descriptor via the communications link in response to the determination that the rule library does not include a rule associated with the query; and
sending a portion of a second synthetic document descriptor via the communications link in response to the determination that the rule library does not include a rule associated with the query.

7. A knowledge base system, comprising:
a document repository including a plurality of documents;
a synthetic document descriptor library including a plurality of synthetic document descriptors, each synthetic document descriptor from the plurality of synthetic document descriptors including a first reference associated with a portion of a first document from the plurality of documents and a second reference associated with a portion of a second document from the plurality of documents;
a rule library including a plurality of rules, each rule from the plurality of rules including a condition identifier field and an action identifier field;
an inference engine to receive a query, to determine that the rule library does not include a rule associated with the query, and to send a portion of a first synthetic document descriptor from the plurality of synthetic document descriptors and a portion of a second synthetic document descriptor from the plurality of synthetic document descriptors via the communications link in response to the determination that the rule library does not include a rule related to the query, the inference engine operatively coupled to the synthetic document descriptor library and the rule library.

8. The system of claim 7, wherein the portion of the first synthetic document descriptor from the plurality of synthetic document descriptors is sent via the communications link before the portion of the second synthetic document descriptor from the plurality of synthetic document descriptors is sent via the communications link based on a ranking value associated with the first synthetic document descriptor from the plurality of synthetic document descriptors and a ranking value associated with the second synthetic document descriptor from the plurality of synthetic document descriptors, the ranking value of the first synthetic document descriptor from the plurality of synthetic document descriptors being greater than the ranking value of the second synthetic document descriptor from the plurality of synthetic document descriptors.

9. The system of claim 7, wherein:
the inference engine is operable to generate a new rule having a value of the condition identifier field associated with the query in response to the determination that the rule library does not include a rule related to the query;
the inference engine is operable to receive an identifier of the first synthetic document descriptor from the plurality of synthetic document descriptors;
the inference engine is operable to store the first synthetic document descriptor from the plurality of synthetic document descriptors at the action identifier field in response to receiving the identifier of the first synthetic document descriptor.

10. The system of claim 7, wherein:
the inference engine is operable to receive an identifier of the first synthetic document descriptor from the plurality of synthetic document descriptors;

the inference engine is operable to select a rule associated with the first synthetic document descriptor from the plurality of synthetic document descriptors at the rule library based on the receiving the identifier of the first synthetic document descriptor; and the inference engine is operable to define a synthetic document based on a value of the action identifier of the rule associated with the first synthetic document descriptor from the plurality of synthetic document descriptors, the synthetic document including the portion of the first document associated with the first reference of the first synthetic document descriptor from the plurality of synthetic document descriptors and the portion of the second document associated with the second reference of the first synthetic document descriptor from the plurality of synthetic document descriptors.

11. The system of claim 7, wherein:

the inference engine is operable to receive an identifier of the first synthetic document descriptor from the plurality of synthetic document descriptors;

the inference engine is operable to select a rule associated with the first synthetic document descriptor from the plurality of synthetic document descriptors at the rule library based on the receiving the identifier of the first synthetic document descriptor; and the inference engine is operable to store a value satisfied by the query at a synonym field of the rule associated with the first synthetic document descriptor.

12. The system of claim 7, wherein the inference engine is configured to determine that the rule library does not include a rule associated with the query based on a comparison of the query with a value of the condition identifier field of each rule from a plurality of rules and a comparison of the query with a value of a synonym field of each rule from the plurality of rules.

13. The system of claim 7, wherein the inference engine is configured to send a document from the plurality of documents in response to a request for the document including an identifier of the document sent via the communications link in response to the determination that the rule library does not include a rule related to the query.

14. A method to modify a knowledge base system, comprising:

receiving a query via a communications link;

comparing the query to a value of a condition identifier field of each rule from a plurality of rules;

comparing the query to a value of a synonym field of each rule from the plurality of rules;

determining, based on the comparing the query to the value of the condition identifier field of each rule from the plurality of rules and the comparing the query to a value of a synonym of the value of the condition identifier field of each rule from the plurality of rules, that the query does not satisfy any rule from the plurality of rules; and receiving, after the determining, a portion of a synthetic document descriptor via the communications link, the synthetic document descriptor including a first reference to a portion of a first document and a second reference to a portion of a second document.

15. The method of claim 14, further comprising:

sending a portion of a first synthetic document descriptor via the communications link in response to the determining; and sending a portion of a second synthetic document descriptor via the communications link in response to the determining.

16. The method of claim 14, further comprising:

generating a new rule if the query is not associated with the value of the condition identifier field or the value of the synonym field of any rule from the plurality of rules, the new rule having a value of a condition identifier field of the new rule associated with the query; and storing a value associated with the synthetic document descriptor at an action identifier field of the new rule.

17. The method of claim 14, further comprising:

selecting a rule from the plurality of rules associated with the synthetic document descriptor; and storing a value satisfied by the query at the synonym field of the rule from the plurality of rules.

18. The method of claim 14, further comprising:

sending a portion of a first document via the communications link in response to the determining; and sending a portion of a second document via the communications link in response to the determining.

19. The method of claim 14, further comprising:

sending a portion of a first document via the communications link in response to a request for the first document including an identifier of the first document sent via the communications link in response to the determining; and sending a portion of a second document via the communications link in response to a request for the second document including an identifier of the second document sent via the communications link in response to the determining.

20. The method of claim 14, further comprising:

generating a new rule if the query is not associated with the value of the condition identifier field or the value of the synonym field of any rule from the plurality of rules, the new rule having a value of a condition identifier field associated with the query;

storing a value associated with the synthetic document descriptor at an action identifier field of the new rule;

receiving a synonym of the query; and storing the synonym of the query at a synonym field of the new rule.

\* \* \* \* \*